United States Patent [19]

Sahara et al.

[11] Patent Number: 5,049,207
[45] Date of Patent: Sep. 17, 1991

[54] HEAT TREATMENT PROCESS FOR BUSHING USED IN TRACK OF ENDLESS TRACK TRACTOR

[75] Inventors: Takahiko Sahara; Hisahiko Kusano; Masayoshi Kaneko; Masahiro Nakajima; Toshihiko Sato, all of Tokyo, Japan

[73] Assignee: Topy Industries Limited, Tokyo, Japan

[21] Appl. No.: 351,438

[22] Filed: May 12, 1989

[30] Foreign Application Priority Data

Sep. 5, 1988 [JP] Japan .................... 63-222031

[51] Int. Cl.$^5$ .............................................. C21D 1/00
[52] U.S. Cl. ...................................... 148/150; 148/152
[58] Field of Search .............. 148/150, 152, 154, 145, 148/143

[56] References Cited

U.S. PATENT DOCUMENTS 3,567,529 3/1971 Burtnett ........................... 148/150
4,210,468 7/1980 McGee ............................ 148/150

FOREIGN PATENT DOCUMENTS 881352 6/1953 Fed. Rep. of Germany .
60-162728 8/1985 Japan .
485753 7/1980 United Kingdom .

Primary Examiner—R. Dean
Attorney, Agent, or Firm—Frishauf, Holtz, Goodman & Woodward

[57] ABSTRACT

A heat treatment process applicable to bushings used in tracks of endless track tractor comprises heating a bushing made of middle carbon low alloy steel material from the outer peripheral surface thereof until the inner circumferential surface thereof achieves a temperature range of $Ac_3 \leq T \leq Ac_3 + 50°$ C. where T is the temperature in °C. of the heated circumferential surface and $Ac_3$ is the transformation temperature in °C. of the steel. The heating is accomplished with an induction heating whereafter the steel is cooled from the outer peripheral surface, resulting in hardening the same along the entire thickness thereof. The treatment is followed by tempering of the steel.

11 Claims, 6 Drawing Sheets

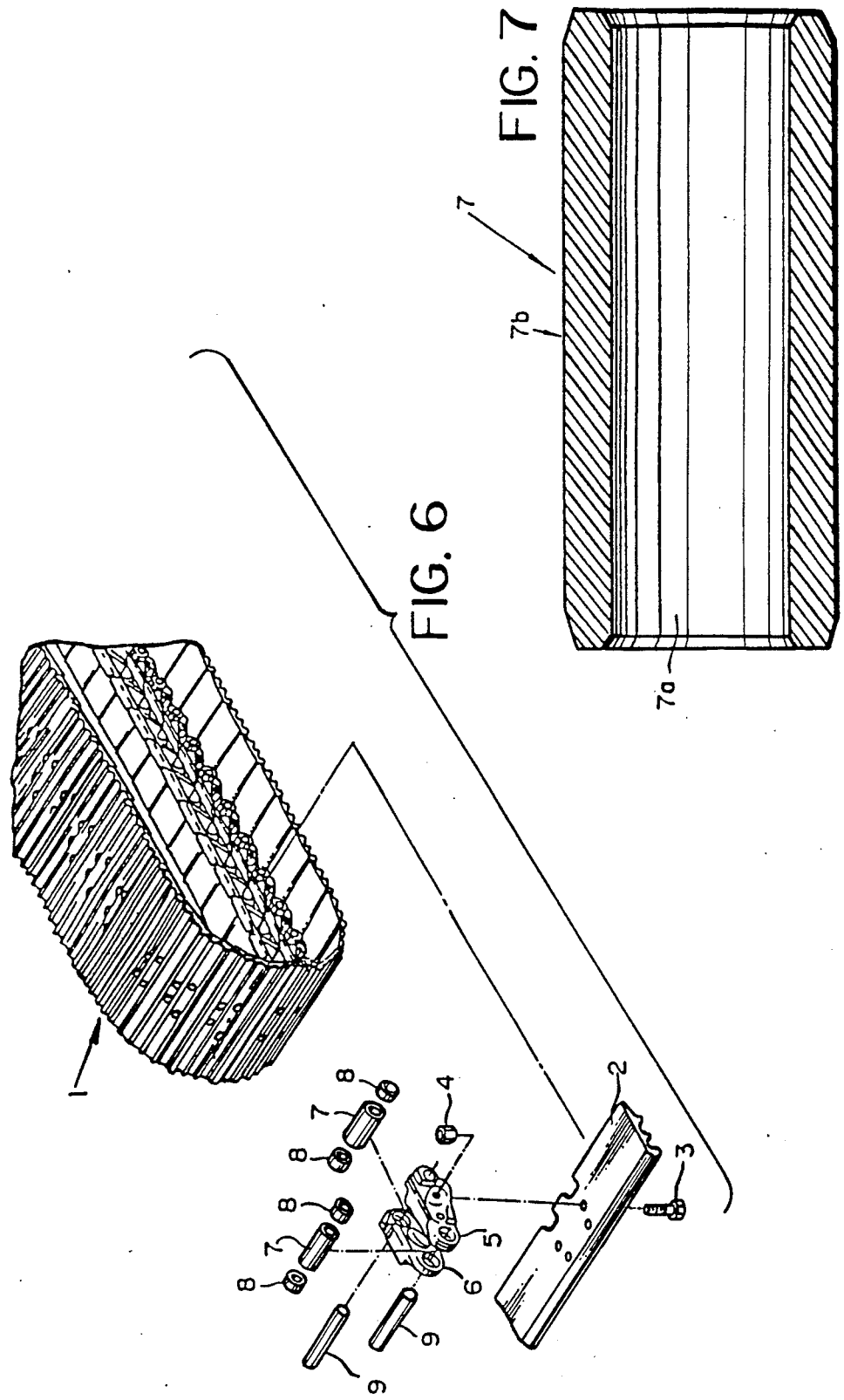

HEAT TREATMENT PROCESS FOR BUSHING USED IN TRACK OF ENDLESS TRACK TRACTOR

BACKGROUND OF THE INVENTION

This invention relates to a bushing which is a component part of a track used for endless track tractors such as bulldozers and power shovels, and more particularly to an effective heat treatment of a bushing for enhancing the wear resistance, strength, toughness and fatigue strength of bushings.

DESCRIPTION OF PRIOR ART

Known tracks used for endless track tractors have the structure shown in FIGS. 6 and 7. The conventional track 1 comprises a pair of links 5,6 which contact a large number of tracker rollers (not shown) on the side of the endless track tractor, plus, pins 9 which join said links 5, 6 in the longitudinal direction thereof, bushings 7 which cover the outer peripheral surface of said pin 9, dust-seals 8 interposed between the ends of said bushings 7 and said links 5, 6, and shoes 2 which are fixed with bolts 3 and nuts 4 on the surface of said links 5, 6 opposing the side contacting the tracker rollers. These components form one block, and the blocks are coupled in an endless manner to form a track 1.

Each of the bushings 7 mentioned above is shaped like a hollow cylinder to allow insertion of a pin 9, and moreover, as shown in enlargement in FIG. 7, the outer peripheral surface 7b thereof is engaged with sprockets (not shown) for driving the endless track when the tractor is running. The inner 7a and outer 7b peripheries of bushings 7 should therefore have high wear resistance. Bushings 7 should also have strength, toughness and fatigue strength which can withstand loads imposed thereon.

In order to meet such severe conditions, bushings for tracks are given various heat treatments.

For example, the method disclosed in Japanese Patent Publication No. 52-34806 uses steel for case hardening (e.g., ISO 683-11, 18CrMo4) as a raw material, and carburizes, hardens and then tempers the material.

Japanese Patent Application laid open under No. 59-77979 discloses another heat treatment method in which a raw material of middle carbon low alloy steel such as ISO 683-1, 34CrMo4 or 34Cr4 or 41Cr4 is subjected to thermal refining to form a malleable portion (sorbite texture) at the center of the thickness, hardened by an induction method on both outer and inner peripheries, and then tempered.

The first method, however, is defective in that it requires a long time for heat treatment, thereby increasing costs, and therefore it is not very practical. The second method is also defective in that it takes a long time and a large number of steps in processing as middle carbon low alloy steel is heated to $Ac_3$ transformation temperature or higher in a heating furnace, oil quenched (quenching by immersion in oil or oil spraying) so as to transform the structure into martensite, and then tempered at a temperature of around 600° C. for thermal refining. The efficiency in processing work is therefore not quite satisfactory.

The inventors of this invention have formerly proposed an induction hardening method for track bushings which does not require thermal refining of the raw material (As is required in the method of Japanese Patent Application Laid-Open No. 59-77979).

The proposed method comprises three stages and is most practical. The first stage of this method comprises the step of hardening a cylindrical bushing material with an induction heating coil from the outer peripheral surface toward the inner peripheral side thereof while the bushing material is rotated in the circumferential direction with respect to its central axis so as to limit the hardness of the inner circumferential surface below critical hardness (ca. HRC 40 or less), and at the same time maintain the hardness of the region extending from the outer peripheral surface to a part of the hardened layer on the inner circumferential side at a level higher than the critical hardness. The second stage of the method comprises the step of water cooling the outer peripheral surface of the material bushing while it is being rotated, and simultaneously hardening the inner circumferential side with induction heating so as to form an effectively hardened layer on the outer circumferential region and an effectively hardened layer on the inner circumferential region, and to form a tempered layer between both effective hardened layers which has a hardness smaller than the critical hardness. The third stage comprises the steps of tempering the thus processed bushing material at low temperature.

OBJECT AND SUMMARY OF THE INVENTION

One object of this invention is to enhance the productivity and to reduce the cost by decreasing the number of necessary steps in the heat treatment with induction heating for bushings.

Another object of this invention is to provide a heat treatment process which does not deteriorate the wear resistance, fatigue strength and toughness of the bushings.

In order to achieve aforementioned objects, this invention method is characterized in that when middle carbon low alloy steel is processed by induction hardening, the outer peripheral surface of the material is subjected to induction heating until the inner peripheral surface thereof reaches temperature in the range of $Ac_3 \leq T \leq Ac_3 + 50$ (T [° C.]: the temperature reached by heating the inner peripheral surface $Ac_3$ [° C.]: transformation temperature), then the outer peripheral surface is cooled so as to quench the material along the entire thickness of a bushing, and the material is tempered.

According to the method of the present invention, tempering is conducted in a furnace within the temperature range of 150° C. to 250° C. so as not to impair the practically effective hardness acquired by the hardening.

The heat treatment process of the present invention also includes a step of heating the inner circumferential surface to 200° C. or 250° C. in the step of induction tempering, so that the outer peripheral side is tempered at a temperature (ca. 170° C.) lower than the temperature of the inner circumferential surface by using the conductive heat transmitted from the inner circumferential surface to thereby decrease the hardness on the inner circumferential surface of the bushing to ca. HRC 50-60 and thereby maintain that on the outer peripheral surface at a level substantially obtained by hardening.

BRIEF DESCRIPTION OF THE DRAWINGS

FIG. 6 shows a prior art track for endless track tractors in which the invention bushing can be used, and a partially exploded perspective view thereof; and FIG. 7 is an enlarged longitudinal section of the bushing shown in FIG. 6.

DETAILED DESCRIPTION

Figure 1:
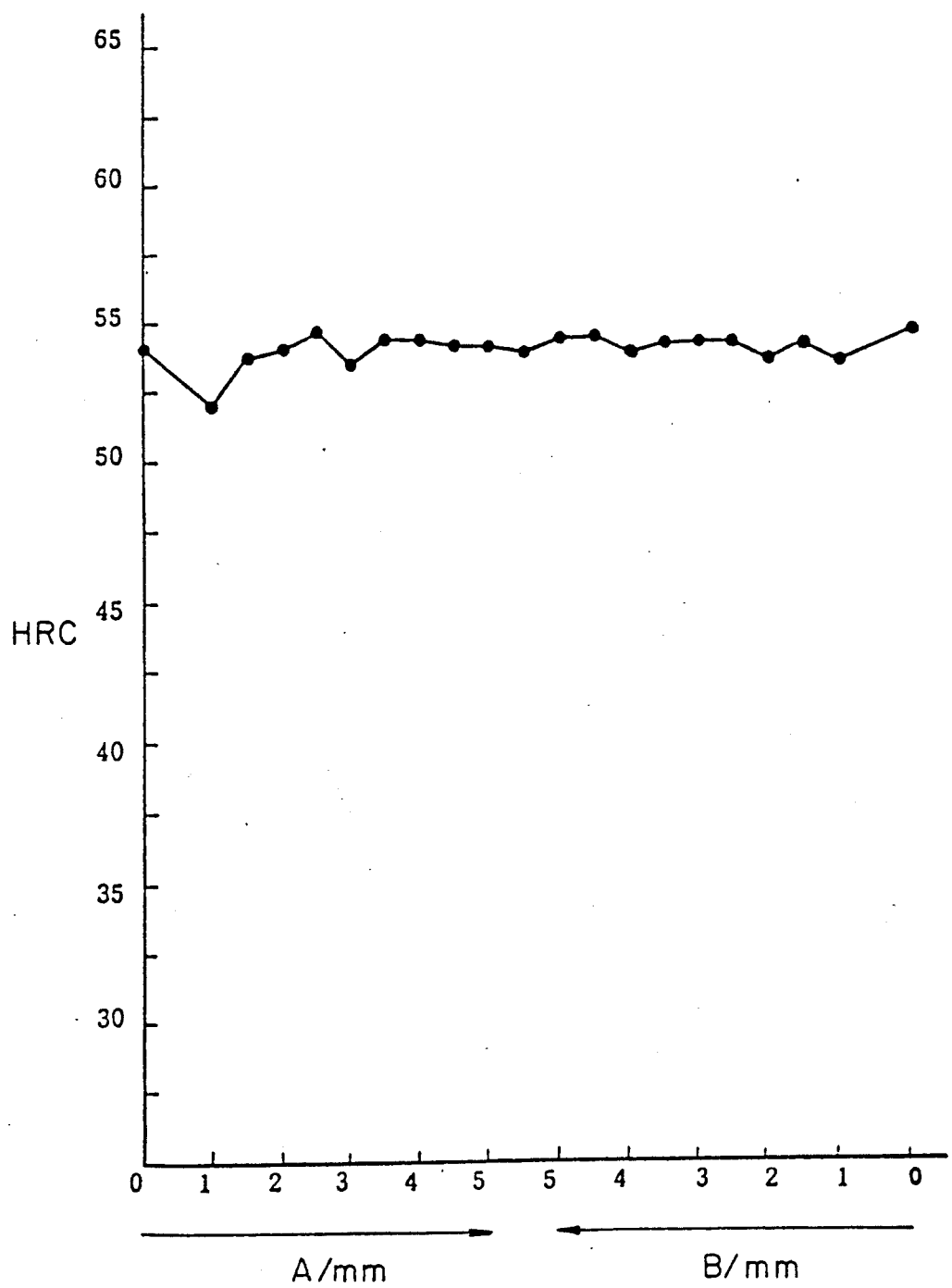
FIG. 1 is a graph showing cross sectional hardnesses (Rockwell hardness) of a bushing manufactured by the method of the present invention in terms of the distance from the outer and the inner surfaces.

This invention relates to a heat treatment process to obtain a bushing with excellent wear resistance, toughness, and fatigue strength which is used in a track of endless track tractors. This invention method will be described by referring to a preferable example in more detail.

A test piece of the bushing for tracks according to this invention method is obtained by machining middle carbon low alloy steel into a cylindrical form.

The test pieces used as the middle carbon low alloy steel was middle carbon chromium boron steel shown in Table 1.

TABLE 1

| Chemical composition of test pieces (%) | | | | | | | | | |
|---|---|---|---|---|---|---|---|---|---|
| C | Si | Mn | P | S | Cu | Cr | Al | Ti | B |
| 0.42 | 0.25 | 0.79 | 0.012 | 0.017 | 0.01 | 1.10 | 0.034 | 0.024 | 0.0021 |

This invention process comprises the first process and the second process: i.e. a step of hardening the entire thickness of a bushing by heating the outer peripheral surface of a bushing material with induction until the inner circumferential surface thereof reaches the temperature in the range of $Ac_3 \leq T \leq Ac_3 + 50°$ C. (T [° C.] : the temperature reached by heating the inner circumferential surface, $Ac_3$ [° C.] : transformation temperature) and cooling the outer peripheral surface of bushing material and a step of tempering thus processed bushing.

In the first step, the test piece of bushing for track is subjected to induction heating from the outer peripheral surface of its cylindrical form followed by cooling from the outer peripheral surface of its cylindrical form to thereby harden the entire thickness thereof. Cooling is accomplished normally by employing water cooling.

In the process of hardening, induction current of 2.5 KHz is used, and the induction heating condition is adjusted to raise the temperature on the inner circumferential surface of the bushing to the range of $Ac_3 \leq T \leq Ac_3 + 50°$ C.(T [° C.]: the temperature reached by heating the inner circumferential surface, $Ac_3$ [° C.] : transformation temperature). If T is below $Ac_3$, the hardening would not occur over the entire thickness, and if T is higher than $Ac_3 + 50°$ C., austenite grain on or near the inner circumferential surface would coarsen. This is not desirable.

Under the conditions mentioned above, finer austenite grain size is obtained on or near the inner circumference of a bushing as shown in Table 2.

TABLE 2

| Austenite grain size number of the bushing obtained by this invention process | | |
|---|---|---|
| | measurement points | |
| T.P. No | near outer peripheral surface | near inner peripheral surface |
| No. 1 | 6.0 | 9.4 |
| No. 2 | 6.4 | 9.4 |

Note: Austenite grain size is measured by ISO: 643

The second step of this invention process comprises the step of tempering the test piece which has been subjected to hardening in the first step. Methods of tempering step are generally known and practiced by persons in this art. Tempering is normally accomplished by heating the steel in a conventional furnace or by induction heating. The tempering method used here may be either the tempering-in-furnace method which heats the test pieces in an oven at the temperature of 150°-250° C. or the induction heating method which heats the inner circumferential surface of a bushing by locating the "heating coil" on the inner peripheral surface side of the bushing.

In the test, test pieces were tempered in a furnace at 200° C. The temperature range of 150°-250° C. used in the process is a range which allows tempering without impairing the practically effective hardness acquired by hardening.

The test pieces of the bushing thus obtained from the first and the second steps were measured for hardness distribution in the direction of thickness and the result is shown in FIG. 1. In the graph of FIG. 1, the vertical axis represents Rockwell hardness expressed in the unit of HRC while the horizontal axis represents the distance from the inner circumferential surface of a bushing in the left half of the graph (A/mm), and from the outer peripheral surface thereof in the right half of the graph (B/mm)

Results of the test conducted by the present applicants showed that substantially uniform hardness is distributed over the outer peripheral surface, core and inner circumferential surface of a bushing If the hardness is in the range of Rockwell hardness HRC 50 or a slightly higher, it provides sufficient wear resistance on the inner circumferential surface and the outer peripheral surface of a bushing.

When a bushing material is tempered with induction heating from the inner circumferential surface of a bushing in relation to the above tempering method, the outer peripheral side may be tempered with the conductive heat transmitted from the inner circumferential surface to enhance the economy of the process.

In such a case, the inner circumferential surface of a bushing sample is heated to 200°-250° C. and at the same time the outer peripheral side is tempered at a temperature (ca. 170° C.) lower than that of the inner surface so that the hardness of the inner circumferential surface is reduced to ca. HRC 50-60 while the hardness of the outer peripheral surface is conveniently maintained at the hardness of the substantially same level obtained by hardening.

Figure 2:
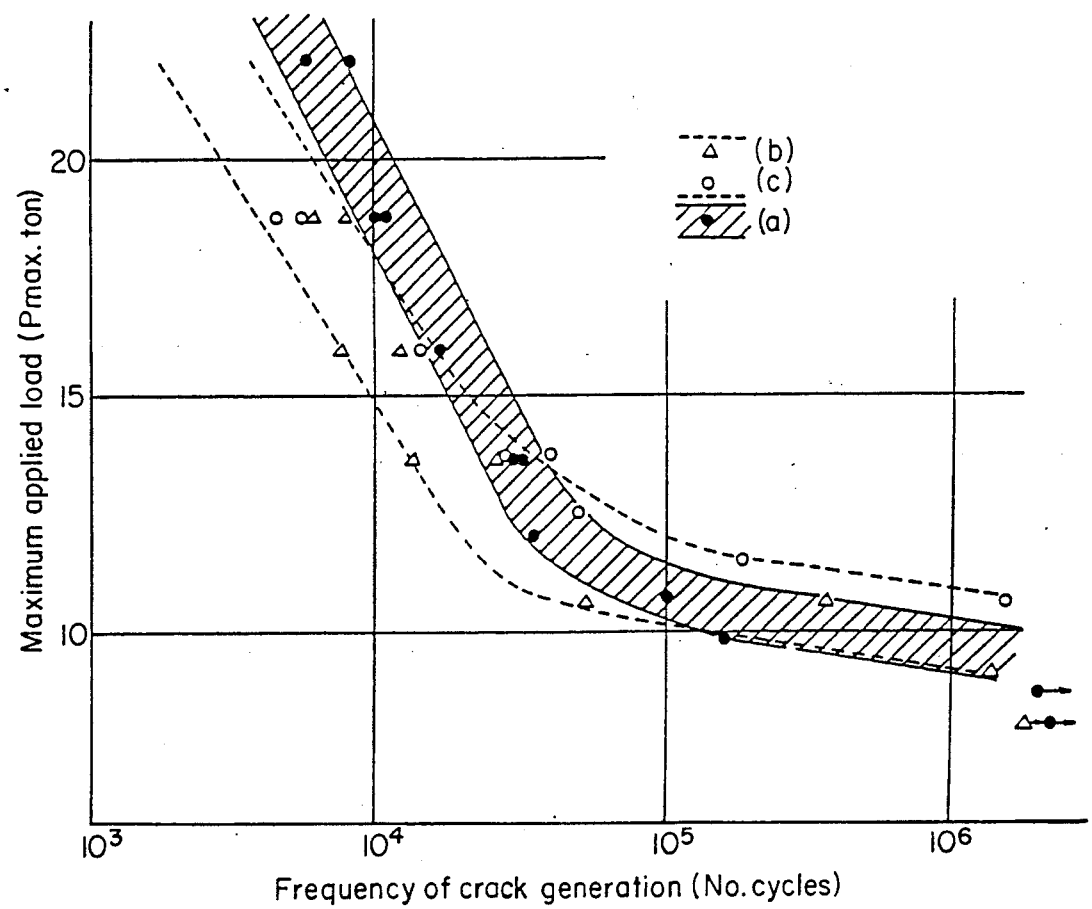
FIG. 2 is a graph comparing the number of load cycles for fatigue crack generation between a bushing made by the method of the present invention and prior art bushings by applying different loads.

FIG. 2 is a graph to show the result of a comparison of fatigue characteristics of this invention bushing with prior art bushings (vertical axis : maximum applied load, horizontal axis : number of cycles for fatigue crack generation). The test pieces used were middle carbon chromium boron steel shown in Table 1, which were hardened by this invention process (tempering in a furnace) and by the prior art process.

As is obvious from FIG. 2, the fatigue characteristic of this invention method bushing (a) is comparable to that of the prior art product which was induction hardened with thermal refining and tempered in a furnace (b) and another prior art product which was induction hardened without thermal refining and tempered in a furnace (c). This invention process product has a quality substantially equal to that of the prior art products.

Figure 3:
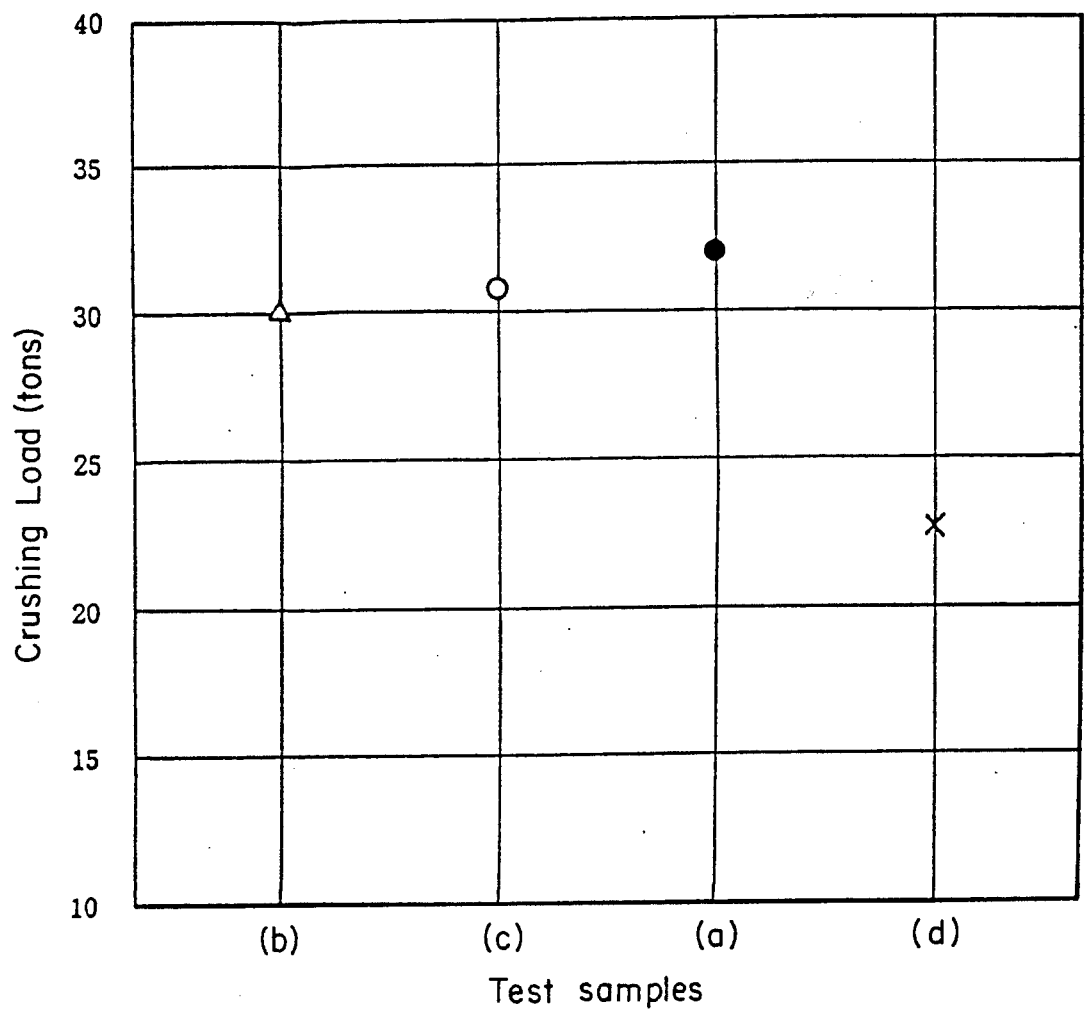
FIG. 3 is a graph comparing the crushing load between a bushing made by the method of the present invention and prior art bushings.

FIG. 3 is a graph to show the result of comparison of a crushing characteristic of this invention product (a) with prior art test samples (vertical axis : crushing load, horizontal axis : test samples).

As is obvious from FIG. 3, the crushing characteristic of the product prepared by this invention method (a) is at least equal to or hi9her than that of the test piece (b) which was induction hardened with thermal refining and tempered in a furnace, and the test piece (c) which was induction hardened without thermal refining and tempered in a furnace, and the test piece (d) which was hardened through the entire thickness thereof by oil quenching and tempered in a furnace.

Figure 4:
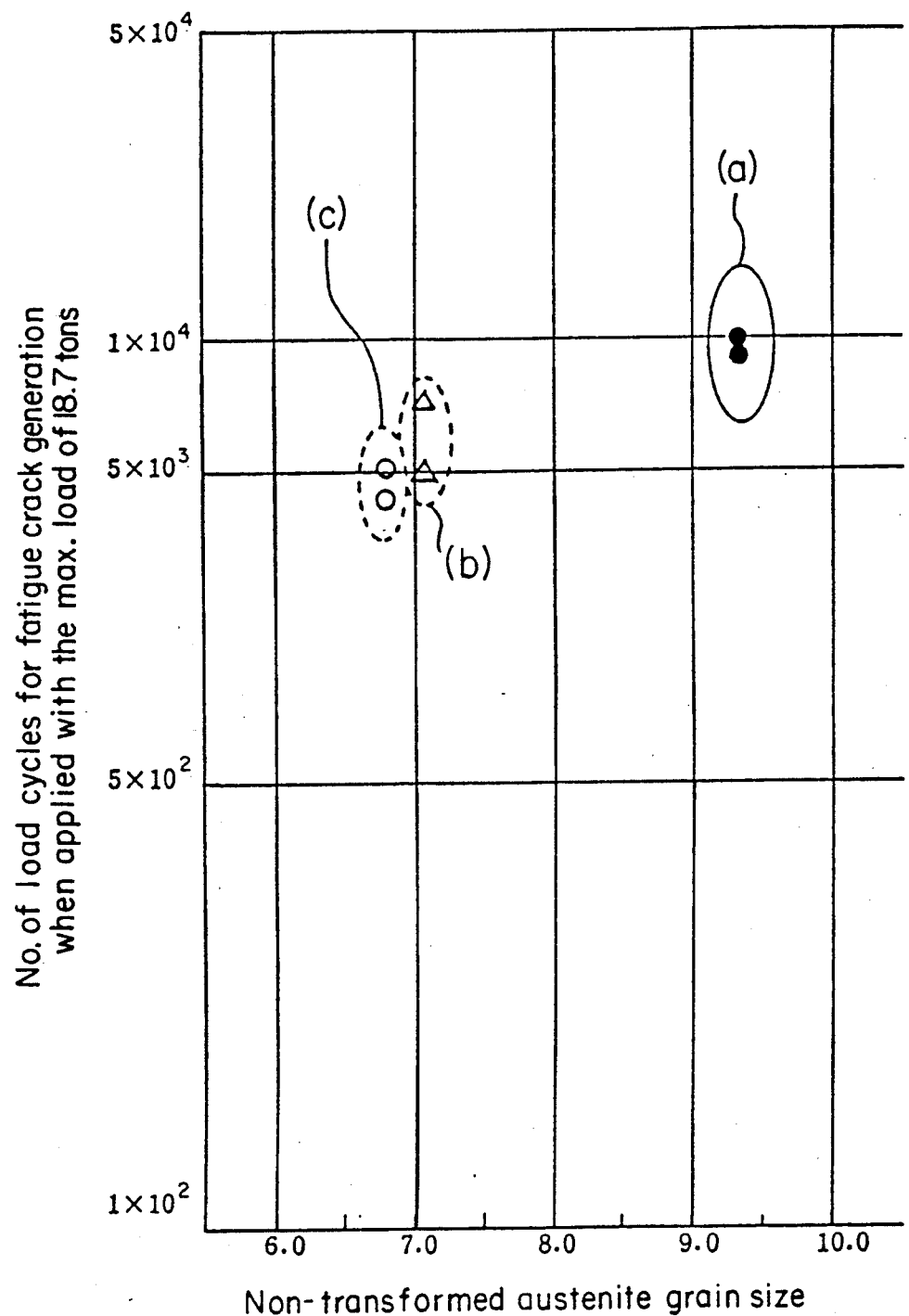
FIG. 4 is a graph comparing the number of load cycles of fatigue crack generation between a bushing made by the method of the present invention and prior art bushings in terms of austenite grain size number when applied with a load of 18.7 tons (high load region)

FIG. 4 shows the relation of the number of load cycles for fatigue crack generation in the high load region substantially comparable to the weight of an endless track tractor such as a power shovel (vertical axis : number of load cycles for fatigue crack generation when applied with the maximum load of 18.7 tons) with the austenite grain size on or near the inner circumferential surface (horizontal axis : austenite grain size number) of a bushing for test samples of FIG. 3.

From FIG. 4, one can easily understand that the finer the grain size, the greater become s the number of load cycles for fatigue crack generation in a high load region. In other words, the cracks occur less frequently.

FIG. 4 also shows that while the austenite grain size number of the prior art test pieces (b) and (c) are 7.2 and ca. 7.0, that of the test piece (a) prepared by this invention process is 9.0 or higher. This demonstrates that as the grain size becomes finer, the resistance against fatigue cracks of this invention product is enhanced over the prior art.

For the test pieces which were hardened by heating and cooling only from the outer peripheral surface and then tempered, compressive residual stress is observed on the inner circumferential surface.

Figure 5A:
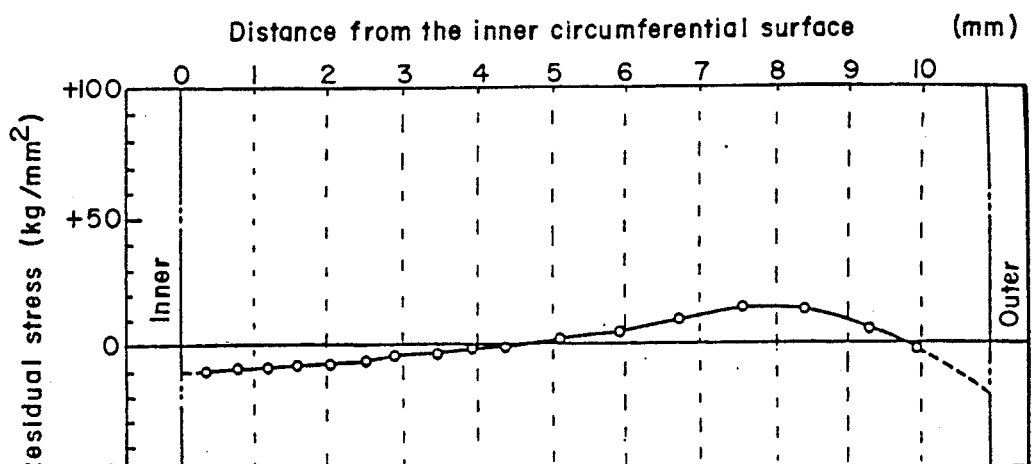
FIGS. 5(a)-5(c) are graphs showing distribution of residual stress on a bushing made by the method of the present invention.
Figure 5B:
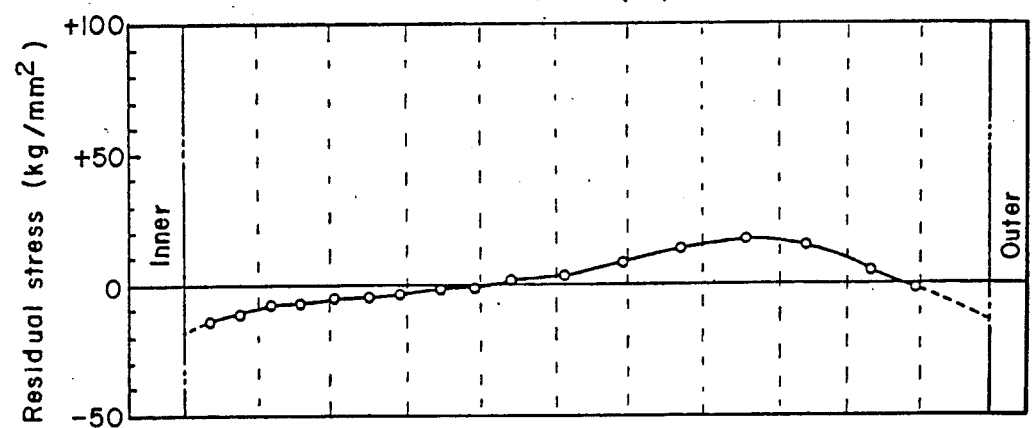
Figure 5C:
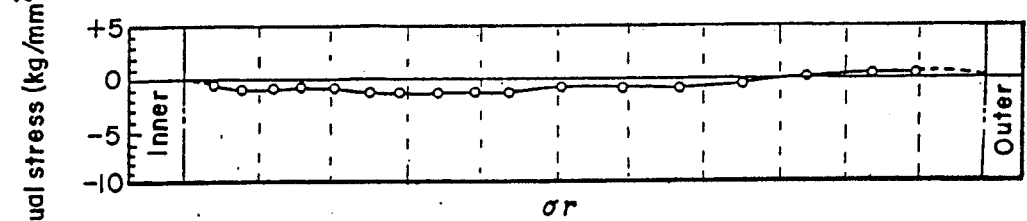

FIG. 5 shows in a graph residual stress distribution of a test piece which was prepared from a middle carbon low alloy steel of the same chemical composition as above by this invention process (tempered in a furnace) (vertical axis : residual stress, horizontal axis : distance from the inner circumferential surface).

As is obvious from FIG. 5, the residual stress becomes compressive on or near the inner circumferential surface. The test samples tempered by said second step can be finished simply by grinding the outer peripheral surface.

Obtained products are incorporated with pins in use in order to couple a large number of link pairs which contact a large number of tracker rollers.

According to this invention, when a bushing for track made of middle carbon low alloy steel is processed by induction hardening, the outer peripheral surface thereof is subjected to induction heating until the temperature of the inner circumferential surface reaches a range of $Ac_3 \leq T \leq Ac_3+50$ (T [° C.]: temperature reached by heating on the inner circumferential surface, $Ac_3$ [° C.] : transformation temperature), and cooling so as to harden the bushing material along the entire thickness, and then the bushing material.

This invention process can eliminate steps of the cumbersome thermal refining process before induction hardening and the induction hardening process on inner circumferential side of a bushing in the process of induction hardening to thereby reduce the number of steps in heat treatment Further, this invention process can harden a bushing along the entire thickness thereof at HRC 50-62 by hardening to thereby maintain the wear resistance on the inner circumference and the outer periphery surfaces of a bushing at an excellent level.

Even though the bushing is hardened over the entire thickness, as the method uses induction heating only on the outer peripheral surface, the inner circumferential surface temperature can be controlled within the range of $Ac_3 \leq T \leq Ac_3+50$ (T [° C.]: temperature reached by heating the inner circumferential surface, $Ac_3$ [° C.]: transformation temperature) to thereby inhibit the coarsening and promote fining of austenite grain on or near the inner circumferential surface. The fatigue strength and toughness of the product by this invention process can therefore be made comparable to or higher than prior art products.

As compressive residual stress is produced on the inner circumferential surface by combining induction hardening which heats and cools only the outer peripheral surface with subsequent tempering, the fatigue strength thereof can be increased.

As this invention process conducts the tempering step in the temperature range of 150° C. to 250° C. in a furnace, it can prevent impairment of practically effective hardness acquired by hardening.

This invention process can also save energy used in the tempering process as well as reduce the hardness on the inner circumferential surface to HRC 50-60 and maintain the hardness on the outer peripheral surface at substantially the same level obtained by hardening since the method heats the inner circumferential surface of a bushing to 200° C. to 250° C., and uses the conductive heat transmitted from the inner circumferential surface for tempering the outer peripheral side at a lower temperature than the inner circumferential side.

The following is an example of high frequency heat treatment according to the present invention.

A. Bush size
  Outer diameter: 59.2 mm
  Inner diameter: 38.8 mm
  Thickness (t) : 10.2 mm
B. High frequency heat treatment conditions for the above bushing
  a. Frequency of the induction current: 3 KHz For the thickness (t) of ca. 5 mm, the current should be 10 KHz.
  b. Surface temperature: The surface temperature measured by a radiation pyrometer after suspending the cooling water was 1,058° C. It was the same when the thickness (t) was 5 mm or thereabout.

c. Heating time (at the start of heating—1,058° C.)

| First cycle: | 6.6 sec. | Mean 4.8 sec. ≐ 5.0 sec. |
|---|---|---|
| Second cycle: | 3.6 sec. | |
| Third cycle: | 4.2 sec. | |

(They are the same when the thickness (t) is 5 mm or thereabout).

d. Mean heating rate $$\frac{1,058}{4.8} \approx 220.4 \; 200° \text{C./sec.}$$

(This is the same when the thickness (t) is 5 mm or thereabout).

e. Cooling rate (from the start of cooling to the time when the cooling water is suspended)

| First cycle: | 29.4 sec. | Mean 29.1 sec. ≐ 30 sec. |
|---|---|---|
| Second cycle: | 28.8 sec. | |

(This is the same when the thickness (t) is 5 mm or thereabout).

f. Surface temperature after cooling is over A contact pyrometer was used to measure the temperature at the center of the bushing;

| First measurement: | 77° C. | |
|---|---|---|
| Second measurement: | 67° C. | Mean 71.3° C. ≐ 70° C. |
| Third measurement: | 70° C. | |

(This was about the same when the thickness (t) is 5 mm).

g. Mean cooling rate $$\frac{1,058 - 71° \text{C.}}{29 \text{ sec.}} = 34° \text{C./sec.}$$

(The rate becomes ca. 50° C./sec. for t=5 mm).

Obviously, many modifications and variations of the invention as hereinbefore set forth can be made without departing from the spirit and scope thereof and therefore only such limitations should be imposed as are indicated by the appended claims.

What is claimed is:

1. A heat treatment process, for bushings having inner circumferential and outer peripheral surfaces and used in tracks or endless track tractors, of the type to harden with induction the bushings made of middle carbon low alloy steel, comprising induction heating the outer peripheral surface of a bushing until the inner circumferential surface thereof reaches the temperature ranged of $Ac_3 \leq T \leq Ac_3 + 50°$ C.; thereafter cooling the outer peripheral surface to harden the entire thickness thereof; and thereafter tempering the bushing; wherein
   T is the temperature in ° C. reached by heating the inner circumferential surface and
   $Ac_3$ is the transformation temperature ° C. of the low alloy steel.

2. The heat treatment of claim 1 wherein the tempering step comprises heating the bushing in a heating furnace to the temperature range of 150° C. to 250° C.

3. The heat treatment of claim 2 wherein the tempering step comprises heating the bushing from the inner circumferential surface using an induction heating coil to temper the inner circumferential side.

4. The heat treatment of in claim 2 wherein in said tempering step comprising heating the outer peripheral side of the bushing to a temperature lower than that of the inner circumferential side, using the conductive heat transmitted from the inner circumferential side.

5. The heat treatment of claim 4 wherein the bushing is rotated in the circumferential direction with respect to a central axis of the bushing during the induction heating.

6. The heat treatment of claim 5 wherein the cooling is water cooling.

7. The heat treatment of claim 1 wherein the tempering step comprises heating the bushing from the inner circumferential surface using an induction heating coil to temper the inner circumferential side.

8. The heat treatment of in claim 1 wherein in said tempering step comprising heating the outer peripheral side of the bushing to a temperature lower than that of the inner circumferential side, using the conductive heat transmitted from the inner circumferential side.

9. The heat treatment of claim 1 wherein the bushing is rotated in the circumferential direction with respect to a central axis of the bushing during the induction heating.

10. The heat treatment of claim 9 wherein the cooling is water cooling.

11. The heat treatment of claim 1 wherein the cooling is water cooling.

* * * * *